United States Patent [19]
Fischer

[11] 3,817,594
[45] June 18, 1974

[54] FOLDABLE BINOCULAR FIELD GLASSES
[75] Inventor: Harald Fischer, Tirol, Austria
[73] Assignee: Swarovski-Optik K.G., Austria
[22] Filed: Mar. 5, 1973
[21] Appl. No.: 338,299

Related U.S. Application Data
[63] Continuation of Ser. No. 130,901, April 5, 1971, abandoned.

[30] Foreign Application Priority Data
May 4, 1970 Austria............................4015/70

[52] U.S. Cl. .................................. 350/70, 350/75
[51] Int. Cl. ............................................. G02b 7/12
[58] Field of Search.......................... 350/70, 75, 76

[56] References Cited
UNITED STATES PATENTS
3,604,779  9/1971  Reinhold............................. 350/75

FOREIGN PATENTS OR APPLICATIONS
178,415   1/1923   Great Britain....................... 350/70
156,917   12/1904  Germany............................. 350/75
360,234   11/1931  Great Britain....................... 350/10

*Primary Examiner*—David H. Rubin
*Attorney, Agent, or Firm*—Toren & McGeady

[57] ABSTRACT

Binocular field glasses are formed of a pair of individual telescopes with one arranged to pivot relative to the other about an asymmetrical joint so that it can be folded from a variable open position into a collapsed or folded position. The joint consists of a short joint arm on one telescope supporting a pin and a considerably longer joint arm secured to and extending from the other telescope and having its outer end secured to the pin, the telescopes have cylindrically shaped housings and each housing has a flattened surface for a portion of its axial length with the flattened surface on one housing forming a recess to receive the longer joint arm secured to the other telescope when the field glasses are arranged in the folded position.

7 Claims, 6 Drawing Figures

INVENTOR.
HARALD FISCHER
BY
Toren and McGrady
ATTORNEYS

INVENTOR.
HARALD FISCHER
BY Toren and McGrady
ATTORNEYS

FOLDABLE BINOCULAR FIELD GLASSES

This is a continuation of application Ser. No. 130,901 filed Apr. 5, 1971, now abandoned.

SUMMARY OF THE INVENTION

The present invention is directed to foldable binocular field glasses and, more particularly, it concerns an asymmetrical joint about which the individual telescopes of the field glasses pivot between a variable open position and a closed position.

The use of direct vision, roof-prisms as image-erecting systems in binocular field glasses permits the use of approximately cylindrically shaped housings, such housings are space saving, easy to form, and afford pleasant appearing enclosures for the optical components. To make such binocular field glasses adaptable to the variable distance between users' eyes, the individual telescopes forming the field glasses must be joined by means of an articulated bridge or joint. However, in the past it has not been possible to provide an articulated bridge which would permit the field glasses to be folded or closed into a desirable flat shape. Based on the dimensions determined by the maximum distance between users' eyes, the articulated bridge necessarily protruded beyond the space occupied by the approximately cylindrical housings disposed in juxtaposed position.

In the past it has been proposed to employ a dual-jointed connecting bridge between the individual telescopes so that the field glasses can be folded in a Z-shaped fashion. The disadvantage of such a dual-jointed bridge exists in the difficulty of precisely mounting the individual telescopes whose axis must not deviate from a parallel arrangement more than one angular minute. When a dual-jointed bridge is used, its center part prevents the individual telescopes from being positioned close to one another because the center part is positioned between them when the field glasses are folded into a closed condition. Further, it is not possible to attach a scale by which the set eye distance can be read.

Accordingly, it is the primary object of the present invention to provide foldable field glasses which afford a compact arrangement in the closed condition with the two individual telescopes being disposed against one another or being spaced only a small distance apart. Further, in this arrangement the articulated bridge does not project from the individual telescopes but rather folds into a recess in one of the telescopes to provide a particularly compact closed arrangement.

Therefore, in accordance with the present invention, the pivot axis of the articulated bridge is asymmetrically arranged relative to the individual telescopes so that one telescope has a long joint arm while the other telescope has a relatively short joint arm. The asymmetry of the pivot axis of the field glasses permits their use in the range of minimum to maximum of eye spacing.

When the field glasses are in the closed position, the asymmetric pivot axis is located on the outer side of one of the individual telescopes, that is relative to the other telescope it is located on the outer side of the telescope housing to which the shorter joint arm is attached. When a first plane is positioned through the axis of the telescope having the shorter joint arm and this plane is positioned perpendicularly to another plane extending through the axis of both of the individual telescopes, the asymmetric pivot axis is located on the opposite side of the first plane from the telescope having the longer joint arm.

One characteristic of the invention is the provision of a axially extending flattened surface in the cylindrically shaped housing of the telescope having the shorter joint arm so that in the folded or closed condition the flattened surface portion forms a recess into which a portion of the longer joint arm is seated in achieving a particularly compact arrangement.

With the longer joint arm positioned within the recess formed in the telescope housing to which the shorter joint arm is attached, it is possible to provide a desired flat shape in the closed condition with such flat shape limited only by the exterior shape of the telescope housings. If a similar flattened surface is provided in the telescope housing from which the longer joint arm extends, then there is the additional advantage that in operating the field glasses the thumbs of the user can be supported against the flattened surfaces which is considered preferable and affords secure and steady holding of the field glasses when in use.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
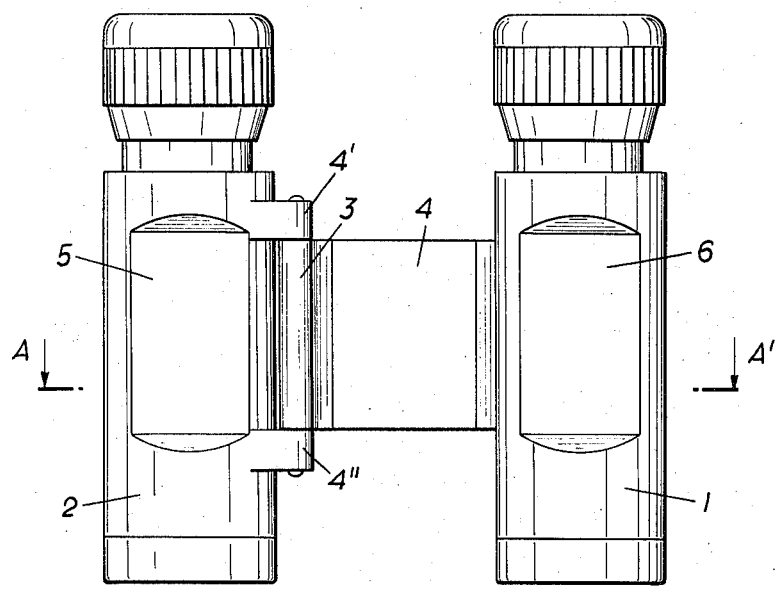
FIG. 1 is an elevational view of binocular field glasses in the open or operating condition, constructed in accordance with the present invention and arranged with the telescope axes spaced the maximum distance apart.
Figure 4:
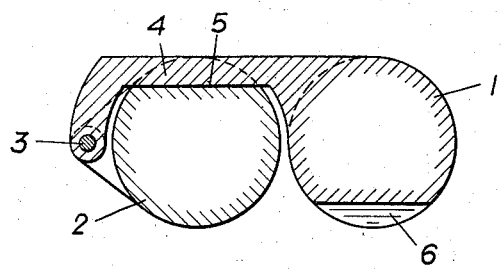
FIG. 4 is a schematic sectional view taken along the line B—B' of FIG. 3.

In FIG. 1 a pair of foldable or collapsible binocular field glasses are shown in the open or use condition. These glasses can be folded from the condition shown in FIG. 1 into a collapsed or compact folded arrangement as indicated in FIG. 4. The pair of binoculars is formed of individual telescopes each positioned within a generally cylindrically shaped housing 1 and 2. For moving the individual telescopes or housings 1 and 2 between the open and closed positions, an articulated joint is provided formed by a long joint arm 4 extending from the housing 1 and a short joint arm extending from the other housing 2 and being formed by a pair of axially spaced lugs 4', 4''. A pivot pin or shaft 3 extends between the lugs 4', 4'' and the outer end of the long joint arm 4 is mounted on the pin 3.

Figure 2:
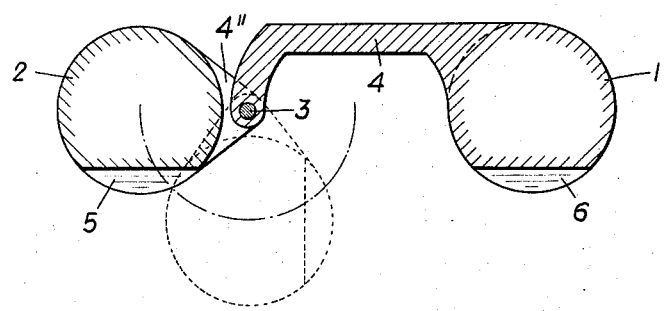
FIG. 2 is a schematic sectional view of FIG. 1 taken along the line A—A'.

As mentioned above, in FIG. 4 the pair of field glasses is shown in the folded or closed position with the housings 1 and 2 disposed in closely spaced side-by-side relationship. The long joint arm 4 extends generally tangentially from the housing 1 for a length greater than the diameter of the housing 2 and its outer end is bent angularly toward the housing 2 in the folded position. When the field glasses are opened, as indicated in FIG. 2, the housing 2 is pivoted about the articulated joint formed by the pin 3 and after being swung through an arc of about 180° it is at its maximum spacing from the housing 1. By varying the position of the housing 2 during the pivoting action relative to the housing 1 the individual telescopes can be adjusted for use by different persons.

Figure 3:
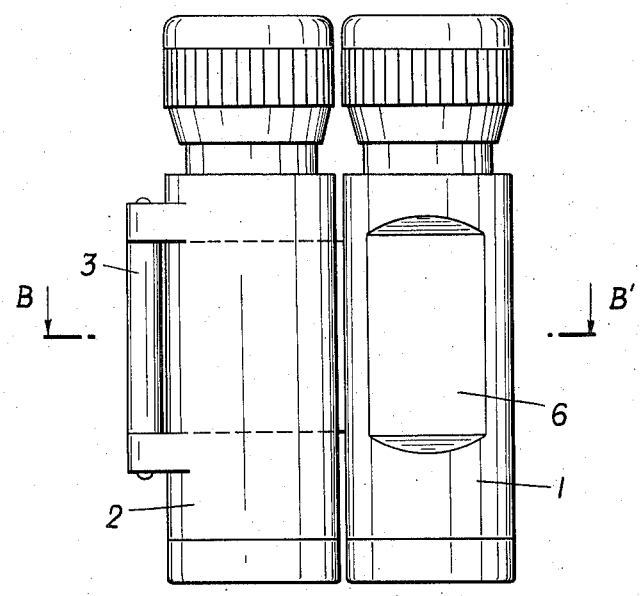
FIG. 3 is an elevational view, similar to that in FIG. 1, however, with the individual telescopes of the field glasses folded into the closed condition.

As shown in FIGS. 1 to 4, the housing 2 has an axially extending flattened surface along one side providing a recess 5, note the position of recess 5 in FIG. 1 when the field glasses are opened. When the glasses are folded as indicated in FIGS. 3 and 4, the flattened surface or recess 5 fits over or receives the long joint arm 4 and provides an especially compact arrangement in the closed or folded condition. Due to the arrangement of the recess 5 it is possible to close the field glasses so that in the closed condition they present a thickness equal only to the diameter of the housings 1 and 2. Further, in the closed condition the glasses have a width normal to the thickness direction and perpendicular to the axis of the housings which is only slightly more than twice the diameter of the housings. The length of the glasses in the folded position, of course, is equal to the height or axial length of the individual telescopes or housings.

The housing 1 has an axially extending flattened surface which provides a recess 6 similar to the recess 5 formed in the other housing 2 as indicated in FIGS. 1 and 3 the recesses are positioned opposite one another so that in the open position, when using the glasses, the thumbs of the user can be rested against the flattened surfaces in the recesses 5 and 6 which enables the user to hold the glasses in a steady and comfortable manner.

Figure 5:
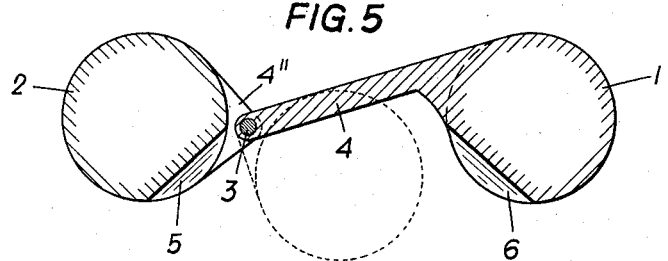
FIG. 5 is a schematic sectional view similar to that shown in FIG. 2 of another embodiment of the present invention, with the field glasses arranged in the open condition.
Figure 6:
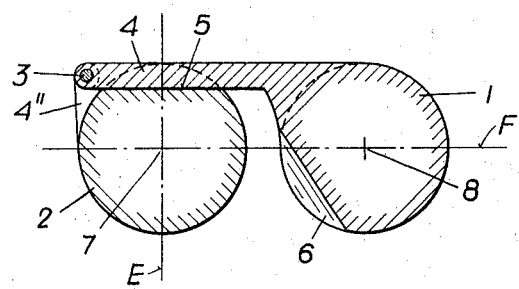
FIG. 6 is a schematic sectional view, similar to FIG. 4, showing the field glasses of FIG. 5 in the closed condition.

As shown in FIG. 4, the pivot axis between the housings 1 and 2 is located approximately in the plane extending through the axes of the housings 1 and 2. However, it is not necessary that the pivot axis be so positioned, as indicated in FIGS. 5 and 6 the axis can be offset in the closed or folded position from the plane passing through the axes of the housings, note plane F in FIG. 6. Accordingly, FIGS. 5 and 6 illustrate another embodiment of the invention in which the elements of the field glasses have the same reference numerals as used in FIGS. 1 to 4. In this second embodiment the long joint arm 4 extends substantially tangentially from the housing 1, but is rectilinear for its full length and is not bent angularly at its outer end. As illustrated, the field glasses in FIGS. 5 and 6 have a recess 5 in the housing 2 which permits it to receive the long joint arm 4 in the folded position in the same manner as the embodiment shown in FIGS. 1 to 4.

Though the long joint arm 4 is shown as being fitted into the recess 5 in the folded position of the glasses, it is within the scope of the invention to provide the long joint arm extending tangentially of both housings 1 and 2 in the folded position of the glasses.

It is essential that the articulated bridge or connection between the housings 1 and 2 be asymmetrically designed for adjustment between the maximum and minimum eye distances of persons using the glasses. In this asymmetrically arranged joint, the joint or pivot axis 3 is located on the side of housing 2 directed away from housing 1. In other words, as shown in FIG. 6, with the plane F extending through the axes 7 and 8 of the housings 2 and 1, respectively, and a plane E extending through the axis 7 of housing 2 and normal to the plane F, the joint or pivot axis 3 is located on the side of the plane E remote from the housing 1. This arrangement is true for both of the embodiments, as indicated in FIGS. 4 and 6. Accordingly, from the folded position shown in FIGS. 4 and 6 the field glasses can be opened to a maximum spacing for accommodating the range of eye spacings to be normally found in users of the glasses.

What is claimed is:

1. Binocular field glasses foldable between a variable open condition and a closed or folded condition and including a first individual telescope and a second individual telescope, each of said first and second individual telescopes comprises an axially extending generally cylindrically shaped housing with the axes of said housings disposed in substantially parallel relationship, and articulated joint means interconnecting said first and second telescopes, wherein the improvement comprises that said articulated joint means consists of a first joint arm, a second joint arm, and a pivot member, said first joint arm is secured to and extends outwardly from said first individual telescope housing transversely of the axis thereof, said first arm having a length which is appreciably less than the diameter of said first housing, said second joint arm is of a greater length than said first joint arm and is secured to and extends generally tangentially outwardly from said second individual telescope housing transversely of the axis thereof and the length of said second joint arm being at least greater than the diameter of said first telescope housing, said pivot member articulates the end of said first joint arm more remote from said housing of said first telescope to the end of said second joint arm more remote from the housing of said second telescope with the axis of said pivot member disposed in generally parallel relationship with the axes of said housings of said first and second telescopes and located asymmetrically relative to the axis of said first and second telescope housings so that said first and second telescopes are displaceable between the closed or folded condition and the variable open condition and in the closed condition the axis of said pivot member about which said first and second telescope housings are articulated is located on the opposite side of a plane through the axis of said first telescope housing from said telescope housing which plane includes the axis of said first telescope housing and extends perpendicularly to the plane extending through and including the axes of said first and second individual telescopes, and said first telescope housing having an inwardly recessed flattened surface portion for a part of its axial length with said flattened portion forming a recess into which said second arm is positioned in the closed condition of the binocular field glasses.

2. Binocular field glasses, as set forth in claim 1, characterized in that said second individual telescope housing has an inwardly recessed flattened surface for a portion of its axial length similar to the flattened surface in said first individual telescope housing.

3. Binocular field glasses, as set forth in claim 1, characterized in that said first joint arm comprises a pair of axially spaced lugs secured to and extending outwardly from said first individual telescope housing, and said pivot member comprises a pin secured to and extending between said lugs.

4. Binocular field glasses, as set forth in claim 3, characterized in that said second joint arm comprises a rectilinear first section extending generally tangentially from said second individual telescope housing and a second section extending angularly from the outer end of said first section and said second section mounted at its end remote from said first section on said pivot pin.

5. Binocular field glasses, as set forth in claim 4, characterized in that said first section of said second joint arm has a length greater than the diameter of said first individual telescope housing.

6. Binocular field glasses, as set forth in claim 3, characterized in that said second joint arm consists of a rectilinear section extending generally tangentially from said second individual telescope housing and connected at its end remote from said second individual telescope housing to said pivot pin.

7. Binocular field glasses, as set forth in claim 6, characterized in that the rectilinear section of said second joint arm has a length greater than the diameter of said first individual telescope housing.

* * * * *